(12) United States Patent
Chen et al.

(10) Patent No.: US 7,689,732 B2
(45) Date of Patent: Mar. 30, 2010

(54) METHOD FOR IMPROVING FLEXIBILITY OF ARBITRATION OF DIRECT MEMORY ACCESS (DMA) ENGINES REQUESTING ACCESS TO SHARED DMA CHANNELS

(75) Inventors: Kuo-Ching Chen, Taipei (TW); Tai-Cheng Chen, Taipei (TW); Ming-Yih Duh, Taipei (TW); Li-Hsiang Wang, Taipei (TW)

(73) Assignee: Via Technologies, Inc., Taipei (TW)

( * ) Notice: Subject to any disclaimer, the term of this patent is extended or adjusted under 35 U.S.C. 154(b) by 240 days.

(21) Appl. No.: 11/361,737

(22) Filed: Feb. 24, 2006

(65) Prior Publication Data

US 2007/0204073 A1 Aug. 30, 2007

(51) Int. Cl.
*G06F 13/28* (2006.01)
*G06F 13/20* (2006.01)

(52) U.S. Cl. .......................................... 710/22; 710/27
(58) Field of Classification Search .................. 710/22, 710/27
See application file for complete search history.

(56) References Cited

U.S. PATENT DOCUMENTS

| | | | | |
|---|---|---|---|---|
| 4,901,234 A | * | 2/1990 | Heath et al. | 710/40 |
| 5,781,799 A | * | 7/1998 | Leger et al. | 710/22 |
| 5,838,993 A | * | 11/1998 | Riley et al. | 710/22 |
| 6,651,119 B2 | * | 11/2003 | Ghodrat et al. | 710/40 |
| 7,062,591 B2 | * | 6/2006 | Pecone | 710/308 |

\* cited by examiner

*Primary Examiner*—Henry W. H. Tsai
*Assistant Examiner*—Hyun Nam
(74) *Attorney, Agent, or Firm*—Thomas, Kayden, Horstemeyer & Risley

(57) ABSTRACT

The invention provides a method improving flexibility of at least one direct memory access (DMA) channel. The at least one DMA channel is used by a plurality of DMA engines of a first device to direct data transmission between the plurality of DMA engines of the first device and a second device. An explanatory embodiment of the method comprises: allowing any of a plurality of DMA engines to use any of the at least one DMA channels, and enabling some of the plurality of DMA engines to share a target channel if some of the plurality of DMA engines simultaneously compete for the target channel, one of the at least one DMA channel.

18 Claims, 7 Drawing Sheets

METHOD FOR IMPROVING FLEXIBILITY OF ARBITRATION OF DIRECT MEMORY ACCESS (DMA) ENGINES REQUESTING ACCESS TO SHARED DMA CHANNELS

BACKGROUND OF THE INVENTION

1. Field of the Invention

The invention relates to direct memory access (DMA), and more particularly to the DMA engines and the DMA channels.

2. Description of the Related Art

Direct memory access (DMA) is a method for facilitating high speed data transfer between a device and memory without CPU intervention. DMA allows hardware subsystems within a computer to access system memory for reading and/or writing independent of the CPU. Many hardware systems use DMA including disk drive controllers, graphics cards, network cards, and sound cards.

DMA is an essential feature of all modern computers, as it allows devices of different speeds to communicate without subjecting the CPU to a massive interrupt load in which the CPU must copy each piece of data from the source a register, and write it back to the new location, rendering the CPU unavailable for other tasks.

A DMA transfer essentially copies a block of memory from one device to another. While the CPU initiates the transfer, the transfer itself is performed by the DMA engine. In a typical example, a block of memory is moved from external memory to faster, internal (on-chip) memory. Such an operation does not stall the processor, which as a result can be scheduled to perform other tasks. DMA transfers are essential to high performance embedded algorithms and networks.

FIG. 1 shows a block diagram of a computer system 100 executing DMA operations. The computer system 100 includes a microprocessor 102, a system memory 104, and peripheral devices 106 and 108. The peripheral devices 106 and 108 may be disk drive controllers, graphics cards, network cards, sound cards, or any chips requiring mass data transfer such as a network switch chip. The microprocessor 102 includes a CPU 110, a system memory controller 114 controlling the data transfer of the system memory 104, a internal bus controller 112 controlling the internal bus of the microprocessor 102, and DMA engines 0 to N respectively controlling the signaling of DMA operation through DMA channels 0 to N. DMA channels are system pathways used by DMA engines to directly transfer data between system memory 104 and peripheral devices.

Each DMA engine has a dedicated DMA channel. For example, DMA engine 0 can only use DMA channel 0, DMA engine 1 can only use DMA engine 1, and DMA engine N can only use DMA engine N. Each DMA channel is connected between DMA engines of opposite sides for negotiating data transfer. For example, DMA channel 0 is connected between the DMA engine 0 of microprocessor 102 and the DMA engine 130 of peripheral device 106, and DMA channel N is connected between the DMA engine N of microprocessor 102 and the DMA engine 134 of peripheral device 108. Each device may have multiple DMA engines, such as microprocessor 102 and peripheral device 106. Two kinds of signal, a DMA request (DREQ) signal and a DMA acknowledge (DACK) signal, are transmitted on a single DMA channel for directing data transfer.

FIG. 2 shows a flowchart of a method 200 for executing a DMA operation with a DMA engine. The device driver first selects a DMA engine for data transfer among the multiple DMA engines of the device in step 202. Because each DMA engine has multiple configuration registers associated with it, the DMA engine's configuration registers have to be set up in step 204 before initiating the data transfer. Typical configuration registers are address registers storing starting address of source and target data, count registers storing transfer byte count, and transfer mode registers indicating single or demand mode. The direction of the data transfer, read or write, is determined in step 206. The DMA engine then transmits the DREQ signal and receives the DACK signal through the DMA channel to direct data transfer in step 208. When the transfer is complete, the device interrupts the CPU in step 210, and the CPU checks whether the DMA operation is successful or has failed.

However, because each DMA engine has dedicated DMA channel, there is no sharing of DMA channels. If two DMA engines try to use the same DMA channel at the same time, the signal transmitted on the DMA channel will be mixed and errors induced. Since DMA channels are limited system resources, if multiple devices with multiple DMA engines in the system, too many DMA channels are occupied and the number of devices using the DMA channels is reduced.

BRIEF SUMMARY OF THE INVENTION

The invention provides a method for improving flexibility of at least one direct memory access (DMA) channel used by a plurality of DMA engines of a first device to direct data transmission between the plurality of DMA engines of the first device and a second device. An embodiment of the method comprises: allowing any of a plurality of DMA engines to use any of the at least one DMA channel, and enabling some of the plurality of DMA engines to share a target channel if some of the plurality of DMA engines simultaneously compete for the target channel.

The invention also provides a direct memory access (DMA) arbitration circuit, coupled between at least one DMA channel and a plurality of DMA engines of a first device, wherein the at least one DMA channel is used by the plurality of DMA engines to direct data transmission between the plurality of DMA engines and a second device. An embodiment of the DMA arbitration circuit comprises a DMA engine arbiter, coupled to the plurality of DMA engines, selecting a channel owner allowed to use a target channel from some of the plurality of DMA engines requesting the target channel, wherein the target channel is one of the at least one DMA channels, and a DMA channel select logic, coupled to the DMA engine arbiter and the at least one DMA channel, allowing the channel owner to be dynamically coupled to and use the target channel.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
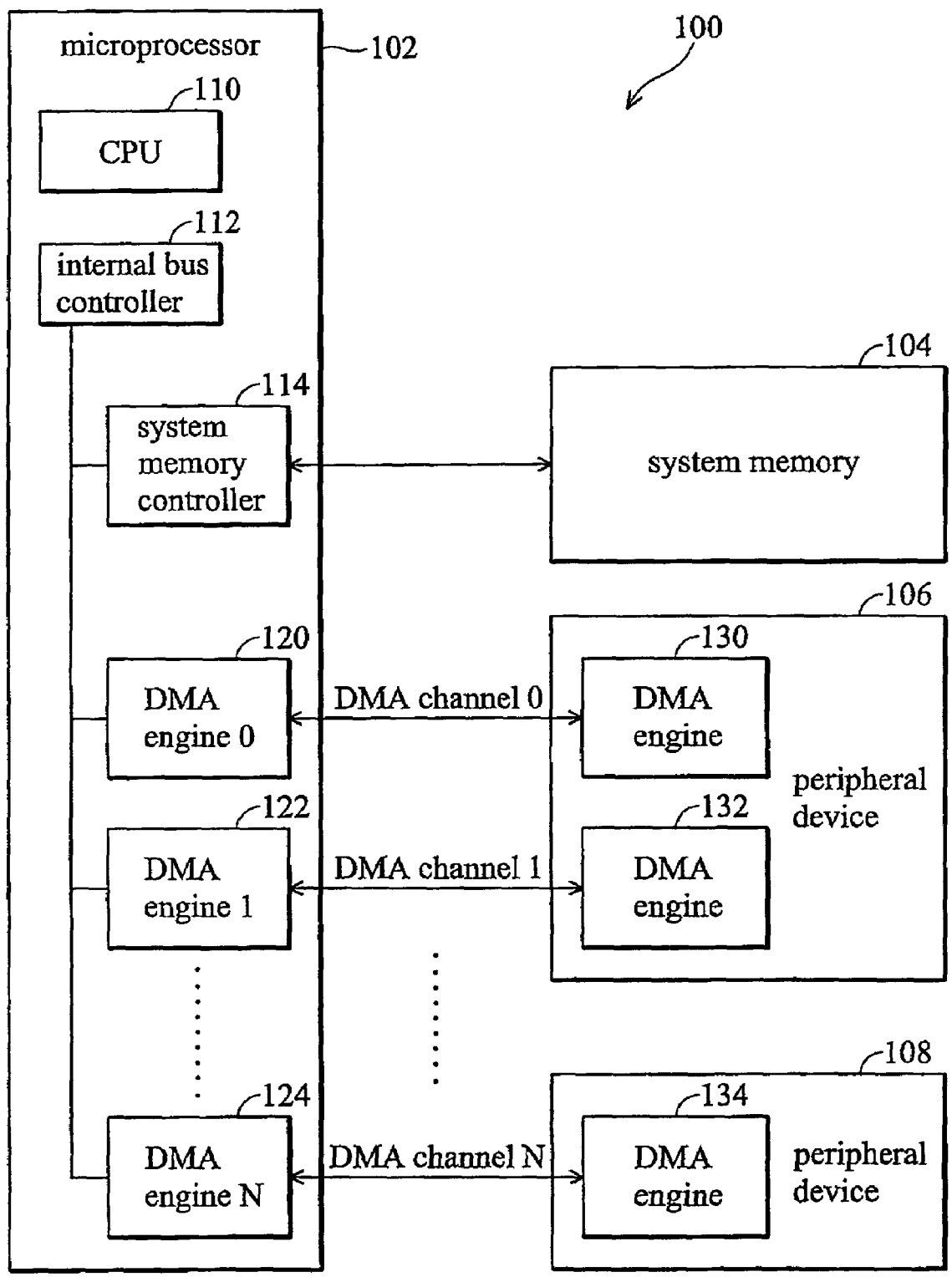
FIG. 1 is a block diagram of a computer system executing DMA operations.
Figure 3:
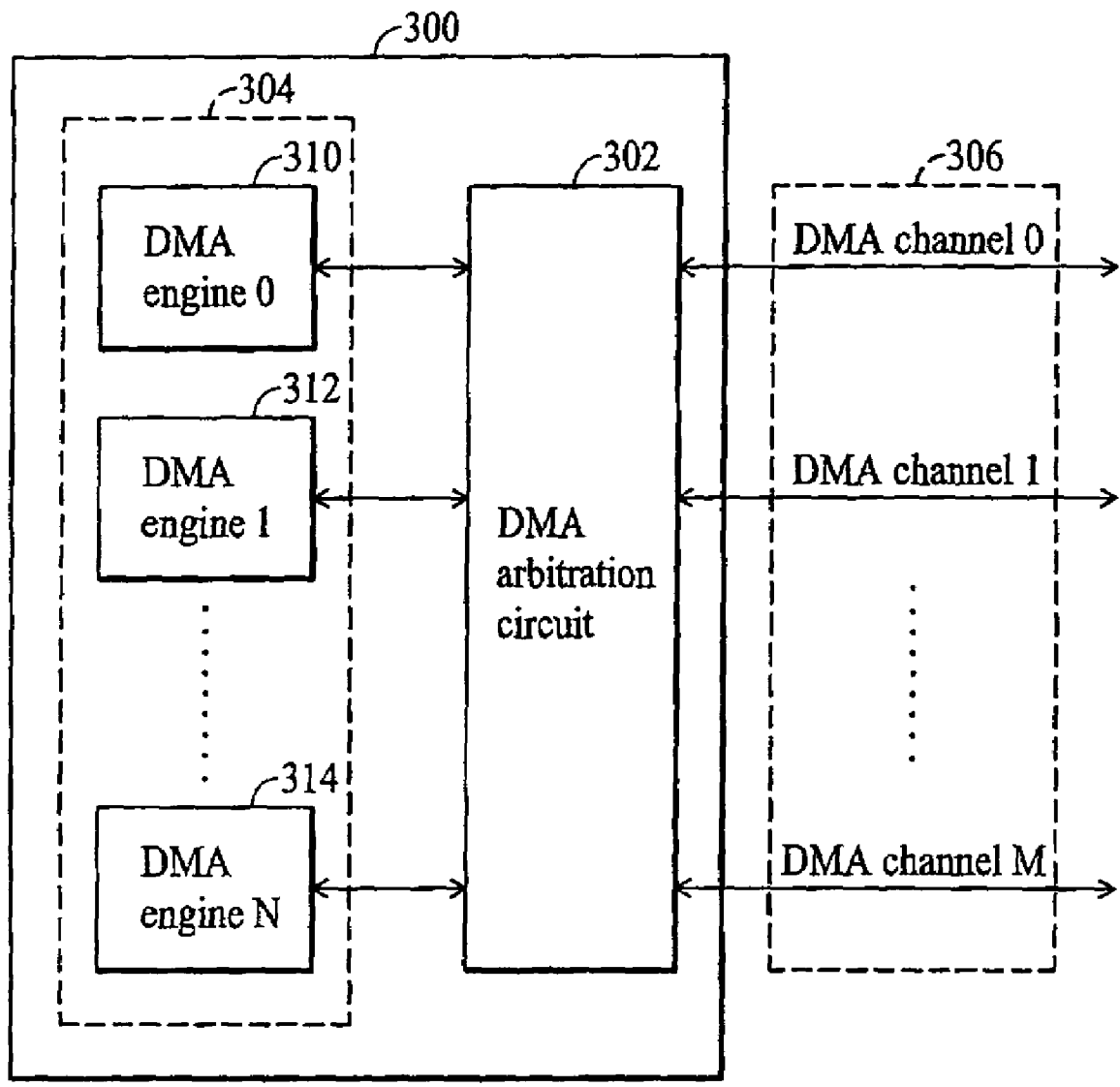
FIG. 3 shows a DMA arbitration circuit for improving the utilization flexibility of DMA channels according to the invention.

FIG. 3 shows a DMA arbitration circuit 302 for improving the utilization flexibility of DMA channels according to the invention. The DMA arbitration circuit 302 is included in a device 300 and coupled between a plurality of DMA engines 304 and at least one DMA channel 306. The device 300 may be the microprocessor 102 in FIG. 1 and uses the DMA channels 306 to communicate with peripheral devices. The device 300 may also be the peripheral device 106 in FIG. 1 and uses the DMA channels 306 to communicate with the microprocessor 102. The plurality of DMA engines 304 includes DMA engines 0 to N. The at least one DMA channel 306 includes DMA channels 0 to M. The number M may be different from and smaller than the number N. The DMA arbitration circuit 302 is capable of allowing any of the plurality of DMA engines 304 to use any of the at least one DMA channel 306. The DMA arbitration circuit 302 also enables some of the plurality of DMA engines 304 to share a target channel if some of the plurality of DMA engines 304 simultaneously compete for the target channel.

Figure 2:
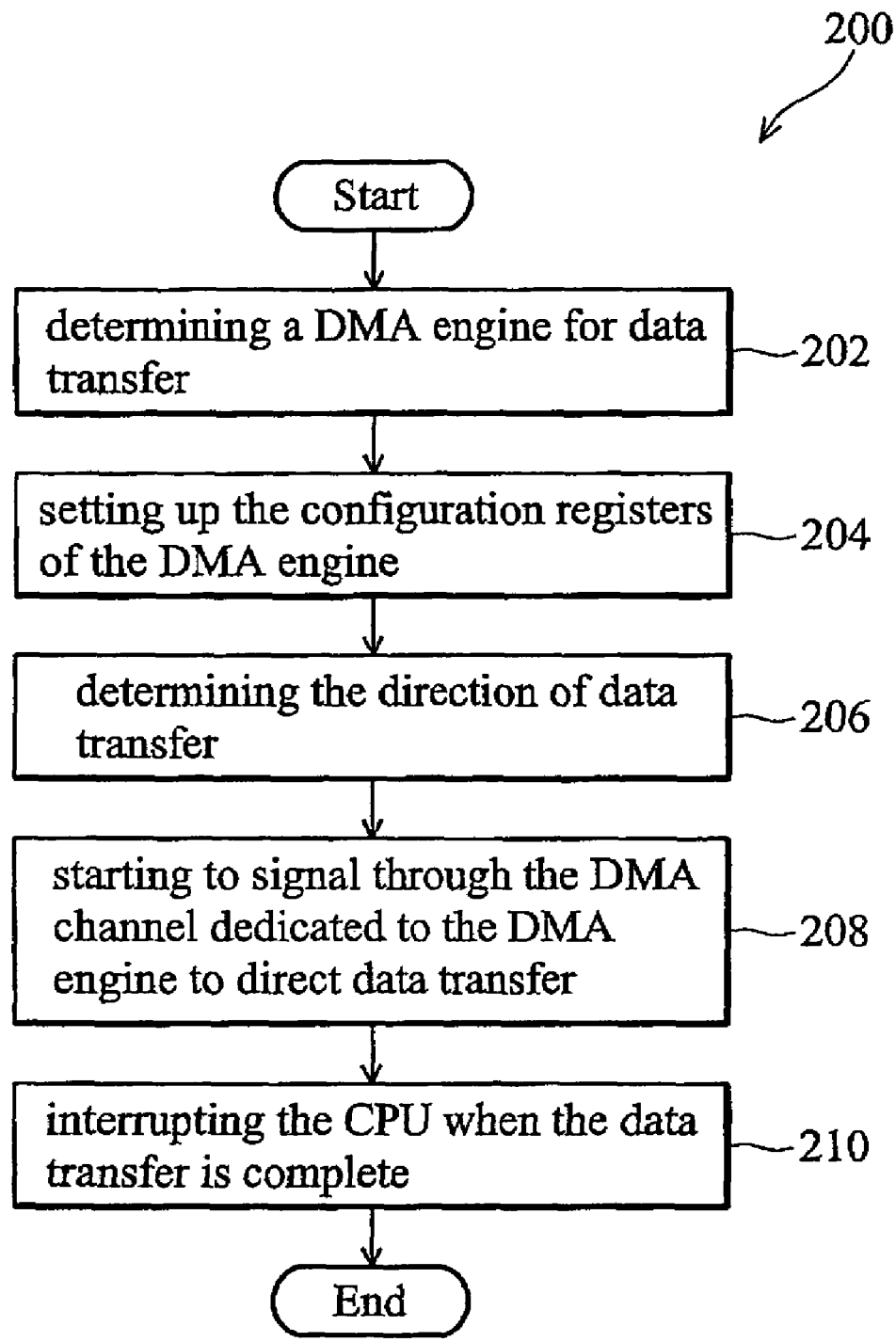
FIG. 2 is a flowchart of a method for executing a DMA operation with a DMA engine.
Figure 4:
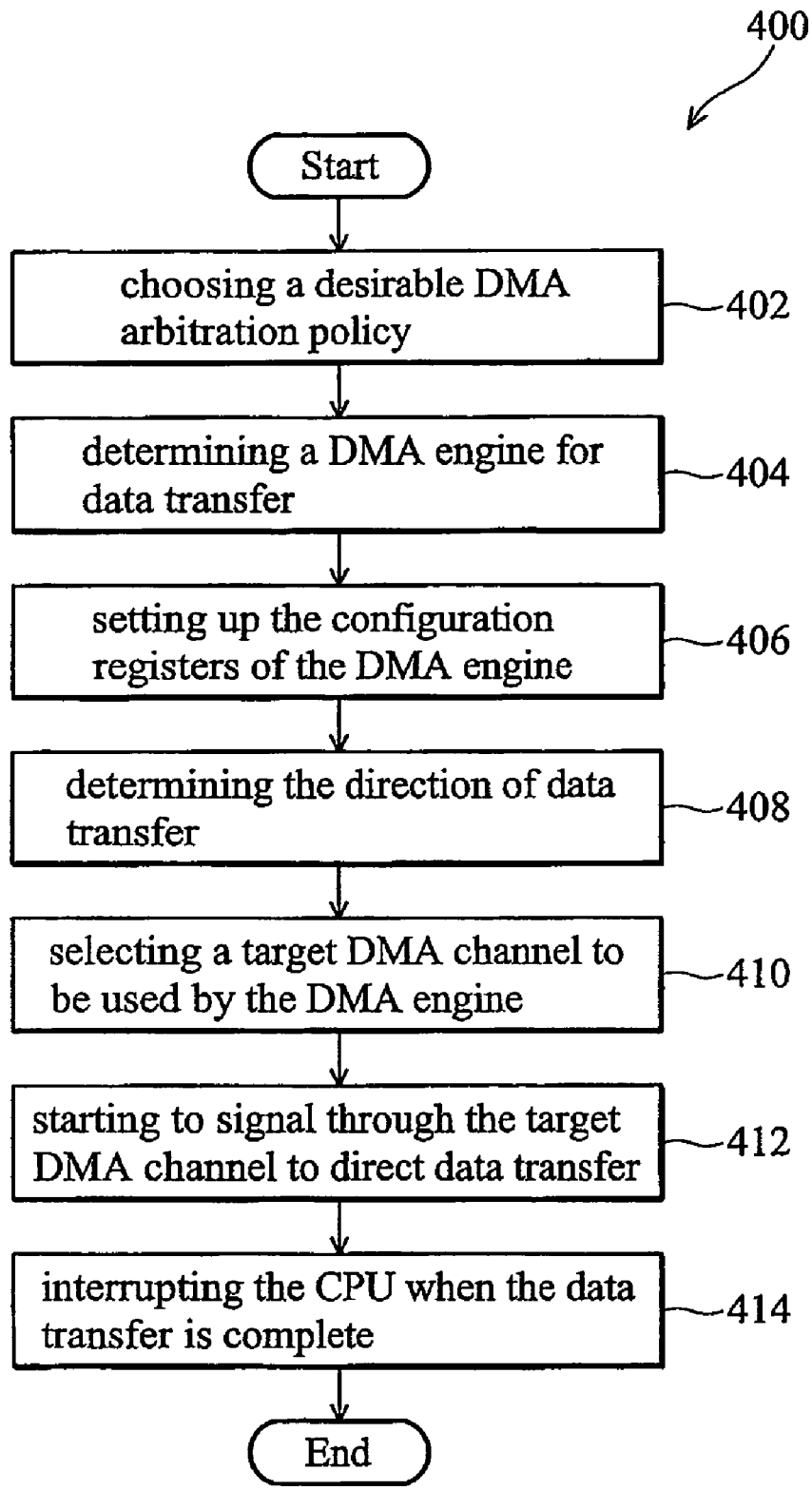
FIG. 4 is a flowchart of a method for executing a DMA operation with a DMA engine according to the invention.

FIG. 4 is a flowchart of a method 400 for executing a DMA operation with a DMA engine according to the invention. Method 400 is similar to method 200 in FIG. 2, but includes two additional steps 402 and 410. In step 402 a desirable DMA arbitration policy is selected from optional DMA arbitration policies. Because the DMA channels are not dedicated to a single DMA engine, multiple DMA engines may request the same target DMA channel simultaneously. Thus, the DMA arbitration circuit 302 must select a DMA engine as a channel owner allowed to use the target DMA channel according to a desirable DMA arbitration policy of step 402 from strict-priority, round-robin, or passive policy. Under strict-priority policy, the DMA engine given the highest priority among the DMA engines requesting the target channel is selected as the channel owner, and the channel owner is permitted to use the target channel until data transmission is finished. Under the round-robin policy, DMA engines requesting the target channel are alternately selected as the channel owner. Under the passive policy, the channel owner is selected from the DMA engines requesting the target channel by the other device on the opposite side of the target channel.

The device 300 then selects a DMA engine for data transfer from the multiple DMA engines of the device in step 404. Because each DMA engine has configuration registers associated with it, the DMA engine's configuration registers must be set up in step 406 before initiating the data transfer. Typical configuration registers are address registers storing starting address of source and target data, count registers storing transfer byte count, and transfer mode registers indicating single or demand mode. The direction of the data transfer, read or write, is determined in step 408. Because the DMA channels are not dedicated to a single DMA engine in the invention, the device 300 must select a target DMA channel to be used by the DMA engine in step 410. The DMA engine then transmits the DREQ signal and receives the DACK signal through the DMA channel to direct data transfer in step 412. When the transfer is complete, the device 300 interrupts the CPU in step 414, and the CPU determines whether the DMA operation is successful or has failed.

Figure 5:
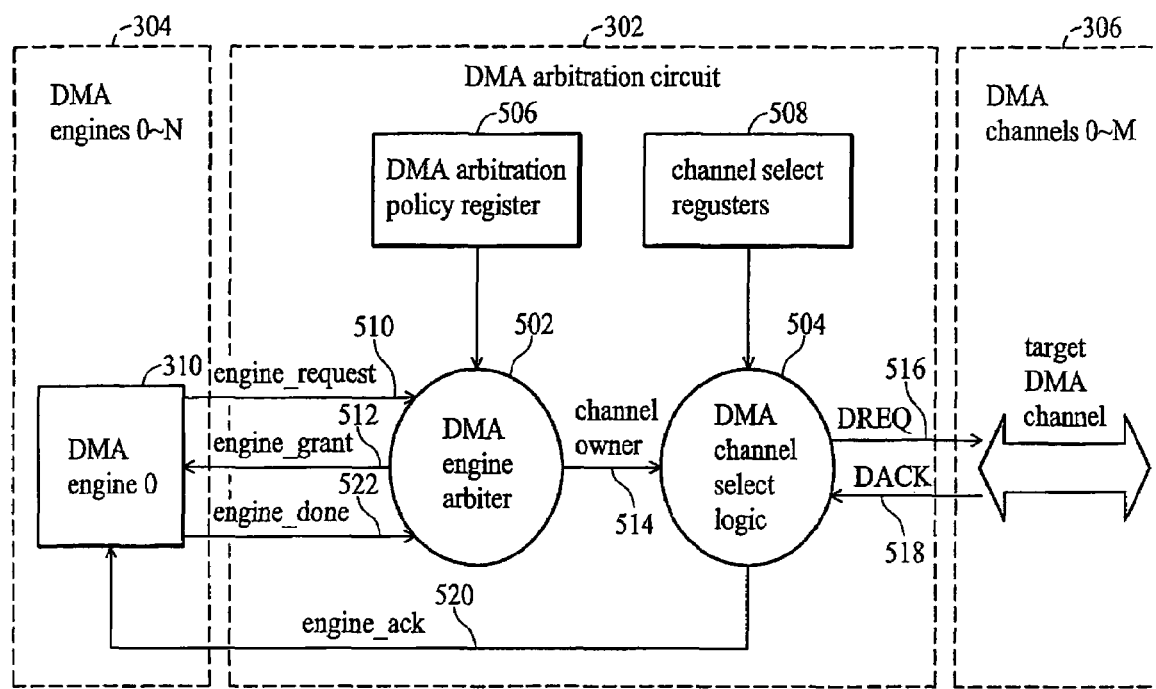
FIG. 5 is a block diagram of a DMA arbitration circuit according to the invention.

FIG. 5 is a block diagram of a DMA arbitration circuit 302 according to the invention. The DMA arbitration circuit 302 is coupled between a plurality of DMA engines 304 and at least one DMA channel 306. The plurality of DMA engines 304 includes DMA engines 0 to N, with only DMA engine 0 shown. The at least one DMA channel 306 includes DMA channels 0 to M, with only target DMA channel shown. The DMA arbitration circuit 302 includes a DMA engine arbiter 502 selecting a channel owner allowed to use a target channel from some of the plurality of DMA engines 304 requesting the target channel simultaneously, and a DMA channel select logic 504 allowing the channel owner to be coupled to the target channel to use the target channel. The DMA arbitration circuit 302 also includes a DMA arbitration policy register 506 storing a desirable DMA arbitration policy chosen in the step 402, and a plurality of channel select registers 508, each of which corresponds to one of the DMA engines 0 to N storing a channel select setting indicating the target DMA channel requested by the corresponding DMA engine.

Figure 6:
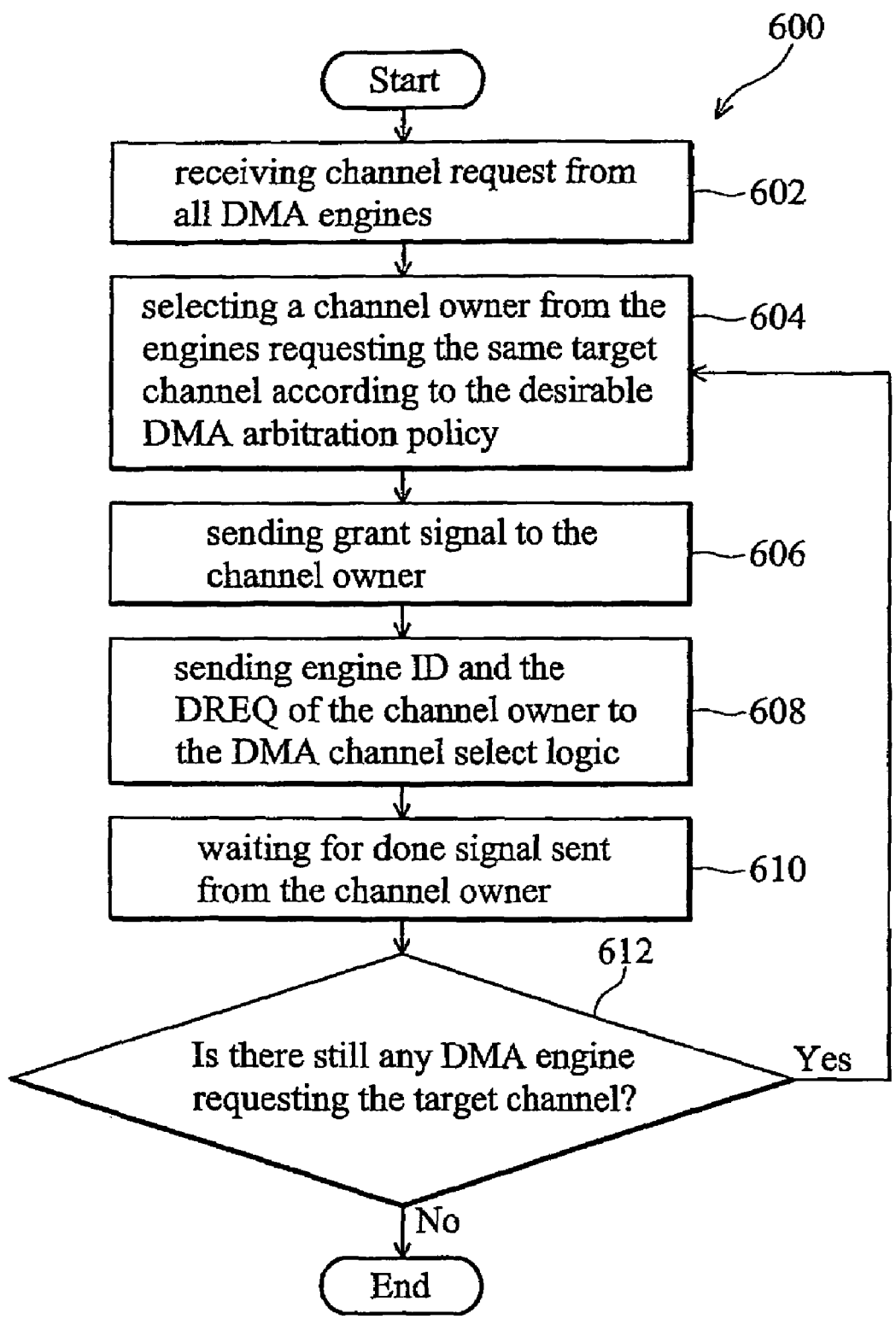
FIG. 6 is a flowchart of a method executed by the DMA engine arbiter for selecting a channel owner allowed to use a target channel.

FIG. 6 is a flowchart of a method 600 executed by the DMA engine arbiter 502 selecting a channel owner allowed to use a target channel. First, the DMA engine arbiter 502 receives channel requests from all of the DMA engines 304 in step 602. The DMA engine arbiter 502 must then select a channel owner from the DMA engines requesting the same target channel according to the desirable DMA arbitration policy in step 604. If both the DMA engines 0 and 1 send an engine_request signal 510 to the DMA engine arbiter 502 in FIG. 5, the DMA engine arbiter 502 checks the channel select settings stored in the channel select registers 508 to determine whether the DMA engines 0 and 1 will compete for the same target channel. If the DMA engines 0 and 1 request different target channels, DMA engines 0 and 1 are appointed as the channel owner of their respective target channels. However, if the DMA engines 0 and 1 compete for the same target channel, the DMA engine arbiter 502 has to select a channel owner from the DMA engines 0 and 1 according to the desirable DMA arbitration policy stored in the DMA arbitration policy register 506.

If both the DMA engines 0 and 1 compete for the same target DMA channel, and the DMA engine 0 is selected as the channel owner of the target channel in step 604. The DMA engine arbiter 502 then sends an engine_grant signal 514 to the channel owner, DMA engine 0, in step 606. The DMA engine arbiter 502 then sends the engine ID 514 of the DMA engine 0 to the DMA channel select logic 504 in step 608. The DREQ signal sent from the DMA engine 0 is also forwarded to the DMA channel select logic 504.

Figure 7:
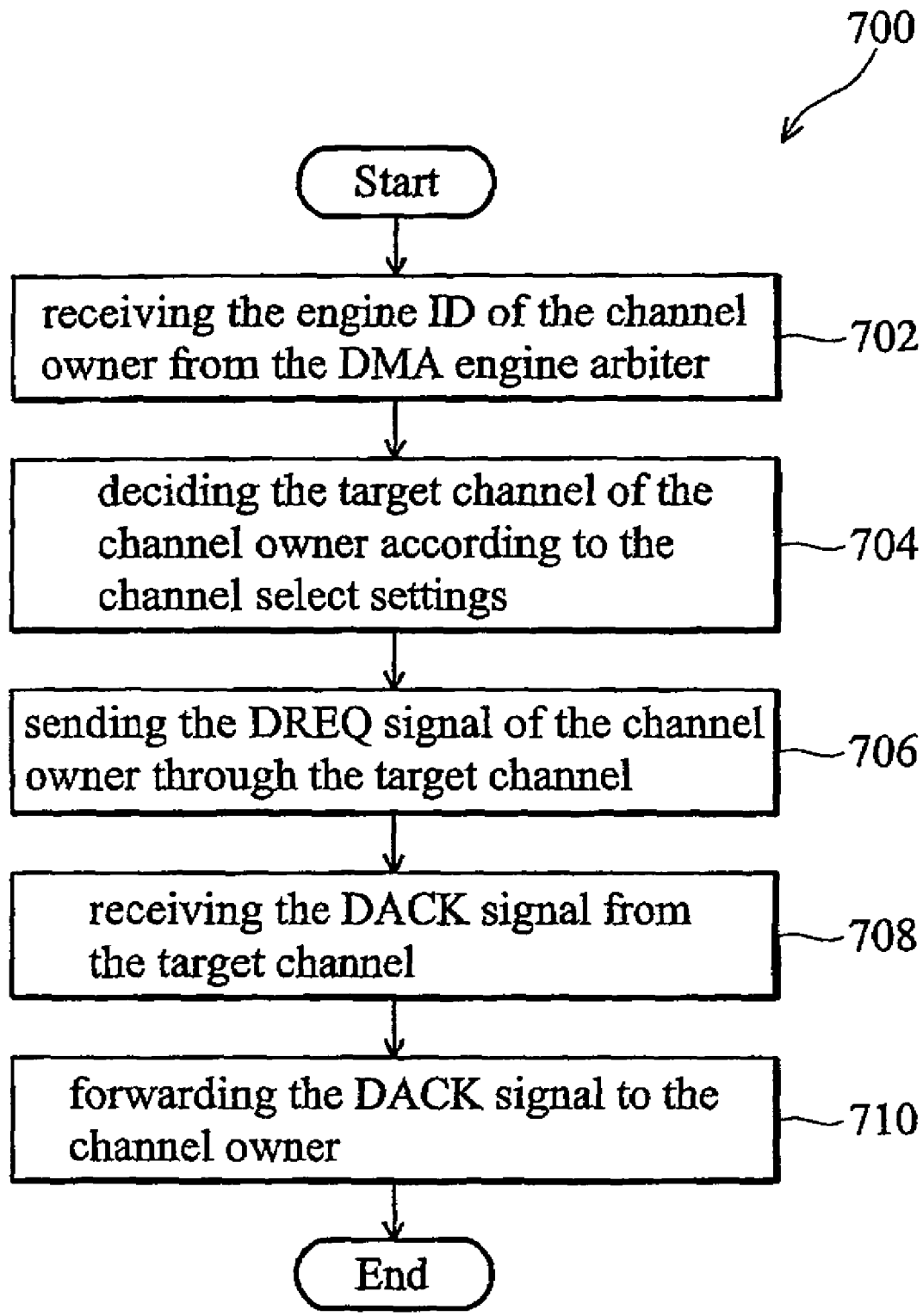
FIG. 7 is a flowchart of a method executed by the DMA channel select logic for letting the channel owner use the target channel.

After the engine ID of the channel owner is received by the DMA channel select logic 504, the DMA channel select logic 504 couples the channel owner to its target channel, and the channel owner uses the target channel to transmit the DREQ signal and receive the DACK signal. FIG. 7 is a flowchart of a method 700 executed by the DMA channel select logic 504 enabling the channel owner to use the target channel. The DMA channel select logic 504 first receives the engine ID 514 of the channel owner from the DMA engine arbiter 502 in step 702. The DMA channel select logic 504 then determines the target channel of the channel owner according to the channel select settings stored in the channel select registers 508 in step 704. The DMA channel select logic 504 then sends the DREQ signal 516 of the channel owner through the target channel in step 708.

The device on the opposite side of the target channel will replys to the DREQ signal 516 with a DACK signal 518, and the DMA channel select logic 504 receives the DACK signal 518 from the target channel in step 708. The DMA channel select logic 504 then forwards the DACK signal to the channel owner with the engine_ack signal 520 in step 710. After the data transfer is complete, the DMA engine 0 sends a engine_done signal 522 to the DMA engine arbiter 502. As shown in FIG. 6, after the DMA engine arbiter 502 receives the engine_done signal 522 in step 610, the DMA engine arbiter 502 determines whether any DMA engines still request the target channel in step 612. If so, the DMA engine arbiter 502 continues to execute step 604 to select another DMA engine as a new channel owner of the target channel. Because a DMA engine 1 still requests the target channel, the DMA engine 1 is selected as the channel owner in step 604.

The invention provides a method for improving flexibility of DMA channels. A DMA arbitration circuit is coupled between the DMA engines and the DMA channels. The DMA arbitration circuit includes a DMA engine arbiter capable of multiplexing a DMA channel for the multiple DMA engines to share the DMA channel. The DMA arbitration circuit also includes a DMA channel select logic for dynamically coupling a DMA engine with the DMA channel for use by the DMA engine. Because every DMA channel coupled to a device can be dynamically assigned to any DMA engine of the device, it is convenient for system software design and system hardware design.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for improving flexibility of at least one direct memory access (DMA) channel, the method comprising:
storing a plurality of channel select settings respectively corresponding to the plurality of DMA engines, for indicating channel requested by the corresponding DMA engine;
determining whether more than one DMA engines are competing a target channel by checking the plurality of channel select settings;
if more than one DMA engines are competing the target channel, requesting the second device to select a channel owner from the more than one DMA engines, wherein the second device and the first device are on opposite sides of the target channel; and
coupling the channel owner with the target channel,
wherein the at least one DMA channel is used by a plurality of DMA engines of a first device to direct data transmission between the plurality of DMA engines of the first device and a second device.

2. The method as claimed in claim 1, wherein the step if more than one DMA engines are competing the target channel, selecting a channel owner from the more than one DMA engines comprising:
choosing a desirable DMA arbitration policy from a plurality of DMA arbitration policies; and
selecting the channel owner according to the desirable DMA arbitration policy.

3. The method as claimed in claim 2, wherein the plurality of DMA arbitration policies include a strict-priority policy, wherein the DMA engine given the highest priority among the more than one DMA engines simultaneously requesting the target channel is selected as the channel owner in the selecting step, and the channel owner is permitted to use the target channel until data transmission of the channel owner is finished.

4. The method as claimed in claim 2, wherein the plurality of DMA arbitration policies include a round-robin policy, wherein the more than one DMA engines simultaneously requesting the target channel are selected as the channel owner alternately in the selecting step.

5. The method as claimed in claim 1, wherein the step coupling the channel owner with the target channel comprising:
coupling the target channel with the channel owner according to the plurality of channel select settings;
sending a DMA request (DREQ) signal of the channel owner to the second device through the target channel;
receiving a DMA acknowledgement (DACK) signal from the second device through the target channel; and
forwarding the DACK signal to the channel owner.

6. The method as claimed in claim 1, wherein the first device or the second device is a micro-processor, and the other one is a peripheral device.

7. The method as claimed in claim 1, wherein the first device and the second device is a network switch chip, and the other one is a micro-processor.

8. A direct memory access (DMA) arbitration circuit, coupled between at least one DMA channel and a plurality of DMA engines of a first device, the DMA arbitration circuit comprising:
a DMA engine arbiter, coupled to the plurality of DMA engines, determining whether more than one DMA engines are competing a target channel, requesting the second device to select a channel owner from the more than one DMA engines if more than one DMA engines are competing the target channel, wherein the second device and the first device are on opposite sides of the target channel;
a DMA channel select logic, coupled to the DMA engine arbiter, for enabling the channel owner to be dynamically coupled to and use the target channel; and
a plurality of channel select registers, coupled to the DMA channel select logic and the DMA engine arbiter, for storing a plurality of channel select settings, each of which represents one of the at least one DMA channel requested by one of the plurality of DMA engines, wherein the DMA engine arbiter checks the plurality of channel select settings to determine whether more than one DMA engines are competing a target channel,
wherein the at least one DMA channel is used by the plurality of DMA engines to direct data transmission between the plurality of DMA engines and a second device.

9. The DMA arbitration circuit as claimed in claim 8, wherein the DMA arbitration circuit further comprises:
a DMA arbitration policy register, coupled to the DMA engine arbiter, storing a desirable DMA arbitration policy chosen from a plurality of DMA arbitration policies.

10. The DMA arbitration circuit as claimed in claim 9, wherein the plurality of DMA arbitration policies include a strict-priority policy, the DMA engine arbiter selects the DMA engine given the highest priority from the more than one DMA engines simultaneously requesting the target channel as the channel owner under the strict-priority policy, and the DMA engine arbiter then grants the channel owner use of the target channel until data transmission of the channel owner is finished.

11. The DMA arbitration circuit as claimed in claim 9, wherein the plurality of DMA arbitration policies include a round-robin policy, and the DMA engine arbiter alternately selects the more than one DMA engines simultaneously requesting the target channel as the channel owner under the round-robin policy.

12. The DMA arbitration circuit as claimed in claim 8, wherein the DMA channel select logic couples the target channel with the channel owner according to the plurality of channel select settings, sends a DMA request (DREQ) signal of the channel owner to the second device through the target channel after receiving the channel owner from the DMA engine arbiter, receives a DMA acknowledgement (DACK) signal from the second device through the target channel, and forwards the DACK signal to the channel owner.

13. The DMA arbitration circuit as claimed in claim 8, wherein the first device or the second device is a microprocessor, and the other one is a peripheral device.

14. The method as claimed in claim 8, wherein the first device or the second device is a network switch chip, and the other one is a micro-processor.

15. The method as claimed in claim 1 further comprising: appointing a first DMA engine requesting the target channel as the channel owner if the first DMA engine is the only DMA engine requesting the target channel from the plurality of DMA engines.

16. The DMA arbitration circuit as claimed in claim 8, wherein the DMA engine arbiter appoints a first DMA engine requesting the target channel as the channel owner if the first DMA engine is the only DMA engine requesting the target channel from the plurality of DMA engines.

17. The method as claimed in claim 2, wherein the plurality of DMA arbitration policies include a passive policy, wherein the channel owner is selected from the more than one DMA engines simultaneously requesting the target channel by the second device in the selecting step.

18. The DMA arbitration circuit as claimed in claim 9, wherein the plurality of DMA arbitration policies include a passive policy, and the DMA engine arbiter selects the channel owner from the more than one DMA engines simultaneously requesting the target channel according to a choice of the second device under the passive policy.

* * * * *